US012245692B2

(12) United States Patent
Xi

(10) Patent No.: US 12,245,692 B2
(45) Date of Patent: Mar. 11, 2025

(54) LIFTING DEVICE AND STORAGE CABINET

(71) Applicants: HEFEI MIDEA REFRIGERATOR CO., LTD., Hefei (CN); HEFEI HUALING CO., LTD., Hefei (CN); MIDEA GROUP CO., LTD., Foshan (CN)

(72) Inventor: Yongxue Xi, Hefei (CN)

(73) Assignees: HEFEI MIDEA REFRIGERATOR CO., LTD., Hefei (CN); HEFEI HUALING CO., LTD., Hefei (CN); MIDEA GROUP CO., LTD., Foshan (CN)

(*) Notice: Subject to any disclaimer, the term of this patent is extended or adjusted under 35 U.S.C. 154(b) by 114 days.

(21) Appl. No.: 17/925,597

(22) PCT Filed: Dec. 29, 2021

(86) PCT No.: PCT/CN2021/142522
§ 371 (c)(1),
(2) Date: Nov. 15, 2022

(87) PCT Pub. No.: WO2022/193779
PCT Pub. Date: Sep. 22, 2022

(65) Prior Publication Data

US 2023/0200564 A1 Jun. 29, 2023

(30) Foreign Application Priority Data

Mar. 16, 2021 (CN) ......................... 202110281727.1

(51) Int. Cl.
*F25D 25/02* (2006.01)
*A47B 88/40* (2017.01)
(Continued)

(52) U.S. Cl.
CPC ............ *A47B 88/42* (2017.01); *A47B 88/457* (2017.01); *A47B 88/483* (2017.01);
(Continued)

(58) Field of Classification Search
CPC ......... A47F 3/06; A47B 88/497; A47B 88/42; A47B 88/457; A47B 88/483;
(Continued)

(56) References Cited

U.S. PATENT DOCUMENTS 5,715,759 A * 2/1998 Lee ........................ A47B 51/00 108/147
10,234,195 B2 3/2019 Yasaka et al.
(Continued)

FOREIGN PATENT DOCUMENTS

CN 1149242 A 5/1997
CN 203735750 U 7/2014
(Continued)

OTHER PUBLICATIONS

ISR mailed Mar. 23, 2022 of PCT Application No. PCT/CN2021/142522.
(Continued)

*Primary Examiner* — Kimberley S Wright

(57) ABSTRACT

A lifting device and a storage cabinet are provided. The lifting device comprises: a supporting member and a lifting assembly, which comprises a rotating wheel, a rotating driving member, a mounting member and a first-stage sliding rail, wherein a flexible cable is wound around the rotating wheel, is adapted to move along with rotation of the rotating wheel, and comprises flexible cable sections located on two sides of the rotating wheel; the rotating driving member is connected to the rotating wheel, and is adapted to
(Continued)

drive the rotating wheel to rotate; the mounting member is provided with a guide rail, and a first fixed pulley is mounted on the mounting member.

13 Claims, 9 Drawing Sheets

(51) Int. Cl.

| | |
|---|---|
| ***A47B 88/42*** | (2017.01) |
| ***A47B 88/457*** | (2017.01) |
| ***A47B 88/483*** | (2017.01) |
| ***A47B 88/497*** | (2017.01) |
| ***B66F 7/02*** | (2006.01) |
| ***B66F 7/28*** | (2006.01) |
| ***F25D 25/04*** | (2006.01) |
| *A47B 88/90* | (2017.01) |
| *A47F 3/06* | (2006.01) |
| *B66D 1/12* | (2006.01) |

(52) U.S. Cl.
CPC .............. *A47B 88/497* (2017.01); *B66F 7/02* (2013.01); *B66F 7/28* (2013.01); *F25D 25/025* (2013.01); *F25D 25/04* (2013.01); *A47B 2088/421* (2017.01); *A47B 2088/901* (2017.01); *A47B 2210/175* (2013.01); *A47F 3/06* (2013.01); *B66D 1/12* (2013.01)

(58) Field of Classification Search
CPC ........ A47B 2210/175; A47B 2088/901; F25D 25/025; F25D 25/04; B66F 7/02; B66F 7/28
See application file for complete search history.

(56) References Cited

U.S. PATENT DOCUMENTS

| | | | | |
|---|---|---|---|---|
| 10,465,970 | B1 * | 11/2019 | Kang | F25D 23/028 |
| 2016/0278517 | A1 * | 9/2016 | DeLorean | F24F 7/007 |
| 2017/0007016 | A1 | 1/2017 | Toedtman | |
| 2018/0128540 | A1 | 5/2018 | Yasaka et al. | |
| 2018/0259246 | A1 * | 9/2018 | Choi | A47B 88/90 |

FOREIGN PATENT DOCUMENTS

| | | | |
|---|---|---|---|
| CN | 106185691 | A | 12/2016 |
| CN | 106627394 | A | 5/2017 |
| CN | 108870847 | A | 11/2018 |
| CN | 210493215 | | 5/2020 |
| CN | 210635630 | U | 5/2020 |
| CN | 111503983 | A | 8/2020 |
| CN | 212081772 | U | 12/2020 |
| CN | 112240666 | A | 1/2021 |
| CN | 112806752 | A | 5/2021 |
| KR | 20180052516 | A | 5/2018 |
| WO | WO-2023050618 | A1 * | 4/2023 |

OTHER PUBLICATIONS

European Patent Office, Extended European Search Report Issued in Application No. 21931351.7, Oct. 31, 2023, Germany, 9 pages.
First OA received in CN Application No. 202110281727.1; mailed Dec. 22, 2023.

* cited by examiner

LIFTING DEVICE AND STORAGE CABINET

CROSS-REFERENCES TO RELATED APPLICATIONS

The present disclosure is a national phase application of International Application No. PCT/CN2021/142522, filed on Dec. 29, 2021, which claims priority to Chinese patent application No. 202110281727.1 filed on Mar. 16, 2021, the entireties of which are herein incorporated by reference.

FIELD

The present application relates to the field of lifting technology, and in particular to a lifting device and a storage cabinet.

BACKGROUND

Traditional drawers in corresponding products basically have a fixed height. For example, the fixed height of the drawer in refrigerator may cause inconvenience in food pick-up and placement. For example, for a drawer at a low position in refrigerator, the user has to bend over to pick up and place foods, which may result in muscle damage; and for a drawer at a high position in refrigerator, children may be unable to pick up and place foods.

Based on the above problems, a lifting drawer is proposed in related art, which, however, requires a large installation space. In addition, the lifting drawer in the related art has a complex structure, high cost and inconvenient disassembly and assembly.

SUMMARY

The present application is intended to address at least one of problems in the related art. The present application provides a lifting device which can solve a problem of inconvenience picking and placing caused by a fixed height of a drawer or a shelf and other support members and can have small space occupation, simple structure, significantly decreased preparation cost and can be convenient in disassembly and assembly.

The present application further provides a storage cabinet.

According to the present application, an embodiment provides a lifting device, including:

- a support member,
- a lifting assembly, including a swiveling wheel, a swiveling drive member, a mounting member and a first-stage sliding rail,
- where a flexible cable is provided to wrap around the swiveling wheel and moves with swivel of the swiveling wheel, and the flexible cable includes flexible cable sections located on both sides of the swiveling wheel,
- the swiveling drive member is connected to the swiveling wheel and is adapted to drive the swiveling wheel to swivel,
- the mounting member is provided with a guide rail and a first fixed pulley,
- the first-stage sliding rail is adapted to slide upwards and downwards relative to the guide rail, and the first-stage sliding rail is fixed to the support member, and
- the flexible cable is provided to wrap around the first fixed pulley, and the flexible cable sections of the flexible cable located on both sides of the swiveling wheel are connected to the first-stage sliding rail.

According to the lifting device in the embodiment of present application, the lifting and lowering of the support member can facilitate the picking and placing of objects, thereby avoiding muscle damage caused by the user's bending and avoiding that the user is unable to reach the objects on the support member. In order to achieve the automatic lifting and lowering of the support member, it is only needed to additionally provide the swiveling wheel, the swiveling drive member, and the pulley, and thus the device has small space occupation, simple structure and significantly decreased preparation cost. In addition, the device is conveniently disassembled since it is only needed to disassemble the swiveling wheel, the swiveling drive member and the fixed pulley.

According to an embodiment of the present application, one or more intermediate sliding rails are provided between the first-stage sliding rail and the guide rail, the first-stage sliding rail is mounted on the guide rail through the intermediate sliding rails, the intermediate sliding rails are provided with movable pulleys, and the flexible cable is provided to successively wrap around the first fixed pulley and the movable pulleys.

According to an embodiment of the present application, the intermediate sliding rails include:

- a second-stage sliding rail mounted on the guide rail and adapted to slide along the guide rail, the second-stage sliding rail being provided with a first movable pulley and a second movable pulley,
- the first-stage sliding rail being mounted on the second-stage sliding rail and is adapted to move relative to the second-stage sliding rail, and
- the flexible cable is provided to wrap around the first fixed pulley, the first movable pulley and the second movable pulley successively.

According to an embodiment of the present application, the lifting assembly further includes:

- a slider, fixed to the first-stage sliding rail and adapted to move in a straight line along the second-stage sliding rail, where the slider is fixedly connected to the flexible cable sections located on both sides of the swiveling wheel.

According to an embodiment of the present application, the slider is fixed to a lower part of the first-stage sliding rail.

According to an embodiment of the present application, the first movable pulley is located at a lower end of the second-stage sliding rail and the second movable pulley is located at an upper end of the second-stage sliding rail.

According to an embodiment of the present application, the flexible cable includes:

- a first flexible cable section, provided between the first fixed pulley and the first movable pulley,
- a second flexible cable section, provided between the first movable pulley and the second movable pulley, and
- a third flexible cable section, provided between the second movable pulley and the first-stage sliding rail,
- the first flexible cable section, the second flexible cable section and the third flexible cable section are arranged in parallel.

According to an embodiment of the present application, the lifting assembly further includes:

- a second fixed pulley, provided on the mounting member, and
- the mounting member includes a mounting plate, the first fixed pulley corresponding to a first end of the guide rail being provided on the mounting plate, the second fixed pulley corresponding to a second end of the guide rail being provided on the mounting plate, and the guide rail being fixed to the mounting plate.

According to an embodiment of the present application, the lifting device further includes:

a tension pulley, provided between the swiveling wheel and the second fixed pulley along an extending direction of the flexible cable.

According to an embodiment of the present application, the swiveling wheel is provided on the mounting member.

According to an embodiment of the present application, in the case where the lifting assembly includes a second-stage sliding rail and the first movable pulley and the second movable pulley provided on the second-stage sliding rail, the swiveling wheel is provided corresponding to the first fixed pulley, the first movable pulley and the second movable pulley, and the diameter of the swiveling wheel is larger than that of the first fixed pulley, the first movable pulley and the second movable pulley.

According to an embodiment of the present application, the swiveling wheel is a belt wheel, and the flexible cable is a belt matching with the belt wheel.

According to an embodiment of the present application, the lifting assembly is provided in pairs on both sides of the support member.

According to an embodiment of the present application, the lifting assembly includes:

a first lifting assembly, provided on a first side of the support member, and including a first swiveling wheel, a second lifting assembly, provided on a second side of the support member, and the second lifting assembly including a second swiveling wheel, the first swiveling wheel and the second swiveling wheel being both connected to the same swiveling drive member.

According to an embodiment of the present application, the support member is a drawer body or a shelf.

According to the present application, an embodiment provides a storage cabinet, which includes a box body, the above mentioned lifting device, where the mounting member is provided in the box body.

According to an embodiment of the present application, the storage cabinet is a refrigerator, a retail cabinet or a display cabinet.

Since the storage cabinet according to the embodiment of the present application includes the above-mentioned lifting device, it has all the technical effects of the above-mentioned lifting device, which will not be repeated here.

The additional aspects and advantages of this application will be partially given in the following description, and some thereof will become obvious from the following description, or be understood through the practice of this application.

BRIEF DESCRIPTION OF THE DRAWINGS

In order to more clearly illustrate the solutions according to the present application or the related art, the accompanying drawings used in the description of the embodiments of the present application or the related art will be briefly introduced below. It should be noted that the drawings in the following description are only part embodiments of the present application. For those of ordinary skill in the art, other drawings can also be obtained according to these drawings without creative efforts.

Figure 1:
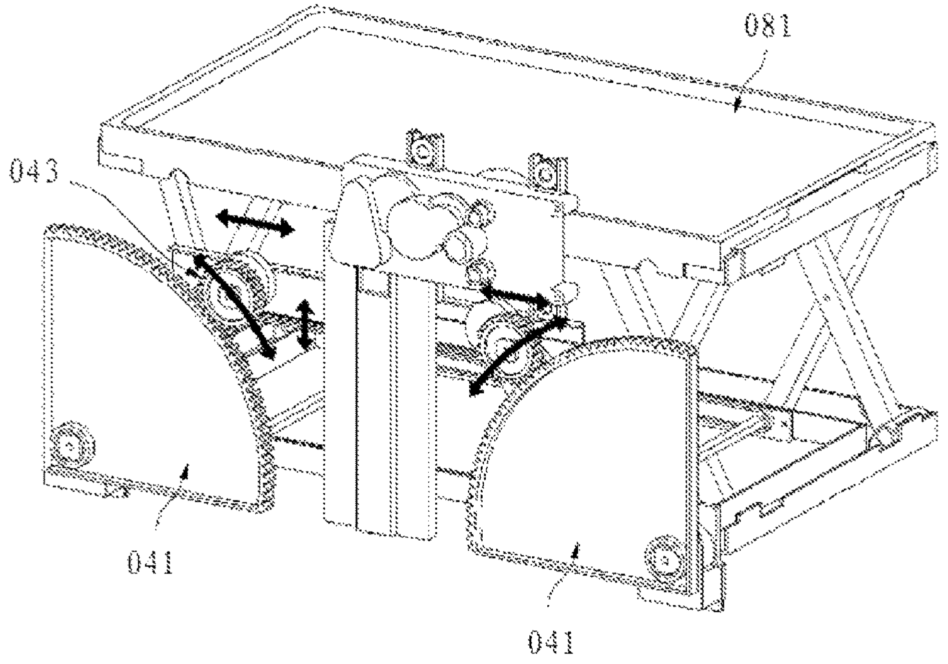
FIG. 1 is a schematic structural diagram of a lifting drawer according to the related art.

Reference numerals, 1: swiveling wheel; 2: flexible cable; 201: first flexible cable section; 202: second flexible cable section; 203: third flexible cable section; 3: mounting member; 301: guide rail; 4: first-stage sliding rail; 5: second-stage sliding rail; 6: first fixed pulley; 7: slider; 8: first movable pulley; 9: second movable pulley; 10: second fixed pulley; 11: fixing member; 12: support member; 13: motor; 14: hand-clasping slot; 15: tension pulley.

DETAILED DESCRIPTION OF THE DISCLOSURE

The implementations of the present application are further described in detail below in conjunction with the accompanying drawings and embodiments. The following embodiments are intended to illustrate the present application, but are not intended to limit the scope of the present application.

In the description of the embodiments of the present application, it should be noted that, the orientation or positional relations indicated by terms such as "center", "longitudinal", "transverse", "upper", "lower", "front", "rear", "left", "right", "vertical", "horizontal", "top", "bottom", "inner", "outer" and the like are based on the orientation or positional relations shown in the drawings, which are merely convenience of description of the embodiments of the present application and to simplify description, but does not indicate or imply that the stated device or element must have the particular orientation, or be constructed and operated in a particular orientation, and thus it is not to be construed as limiting the embodiments of the present application. Furthermore, the terms "first", "second" and "third" are used for descriptive purposes only and should not be construed as indicating or implying a relative importance.

In the description of the embodiments of the present application, it should be noted that unless explicitly stated and defined otherwise, the terms "connected to" and "connected" shall be understood broadly, for example, it may be either fixedly connected or detachably connected, or can be integrated; it may be either mechanically connected, or electrically connected; it may be either directly connected or indirectly connected through an intermediate medium. The specific meanings of the terms above in the embodiments of the present application can be understood by a person skilled in the art in accordance with specific conditions.

In the embodiments of the present application, unless explicitly stated and defined otherwise, a first feature being “up” or “down” a second feature may mean that the first feature is directly contacted with the second feature, or the first feature and the second feature are indirectly contacted through an intermediate medium. Also, a first feature being “above”, “over” and “on” a second feature may mean that the first feature is directly above or obliquely above the second feature, or simply means that a level of the first feature is higher than that of the second feature. A first feature being “below”, “under” and “down” a second feature may mean that the first feature is directly below or obliquely below the second feature, or simply means that a level of the first feature is lower than that of the second feature.

In the description of this specification, the reference terms such as “an embodiment”, “some embodiments”, “example”, “specific example”, or “some examples”, and the like mean that specific feature, structure, material or characteristic described in conjunction with the embodiment or example is included in at least one embodiment or example of the present application. In this description, schematic expressions of the above terms are not necessarily directed to the same embodiment or example. Furthermore, the described specific feature, structure, material or characteristic can be combined in any suitable manner in any one or more embodiments or examples. In addition, those skilled in the art can combine various embodiments or examples and features in various embodiments or examples described in this description unless they are contradictory.

Referring to FIG. 1, a lifting drawer according to the related art includes a guide member 041 and a swiveling gear 043, and the lifting of support plate 081 is achieved by the cooperation between the guide member 041 and the swiveling gear 043. However, the guide member 041 and the swiveling gear 043 occupy large installment spaces and will interfere with the picking and placing of foods on the support plate 081.

Figure 2:
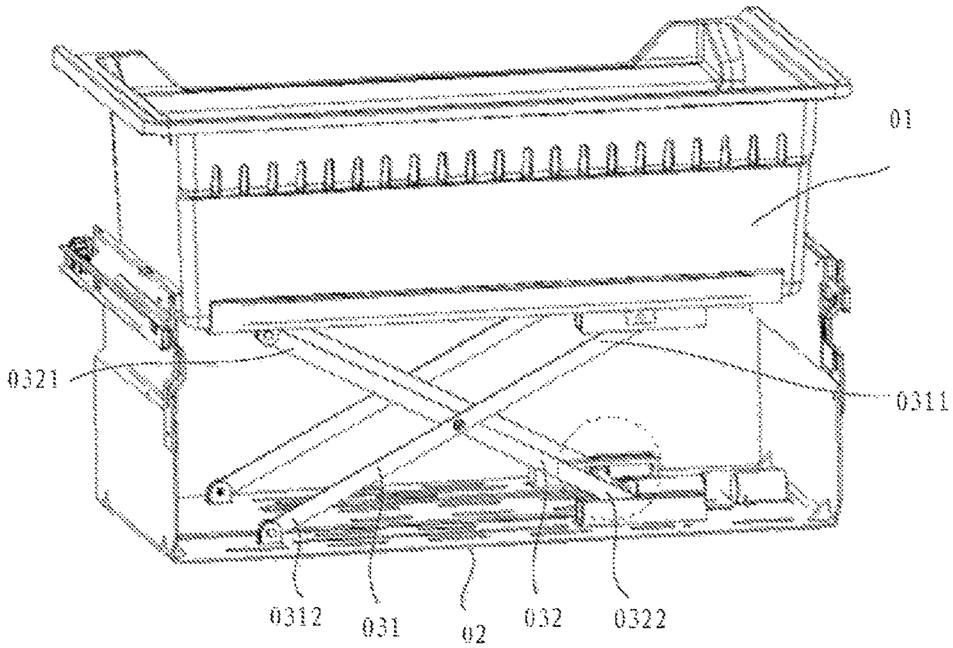
FIG. 2 is a schematic structural diagram of another lifting drawer according to the related art.

FIG. 2 shows another lifting drawer according to the related art, which is provided with an automatic lifting mechanism between a storage portion 01 and a drawer base 02, where the automatic lifting mechanism includes at least one group of hinge rod assembly. The hinge rod assembly includes a first hinge rod 031 and a second hinge rod 032 hinged to each other in the middle. A lower end 0312 of the first hinge rod 031 is hinged to the drawer base 02, and an upper end 0311 of the first hinge rod 031 is slidingly connected to the storage portion 01. A lower end 0322 of the second hinge rod 032 is slidingly connected to the drawer base 02, and an upper end 0321 of the second hinge rod 032 is hinged to the storage portion 01. In the lifting drawer as shown in FIG. 2, the automatic lifting mechanism has problems of complex structure, high cost and inconvenient disassembly and assembly.

In order to overcome the above defects of the lifting drawer according to the related art, an embodiment of the present application provides a lifting device, as shown in FIGS. 3 to 10, including a support member 12 and a lifting assembly. The lifting assembly includes a swiveling wheel 1, a swiveling drive member, a mounting member 3 and a first-stage sliding rail 4. A flexible cable 2 wraps around the swiveling wheel 1, is adapted to move with the swivel of the swiveling wheel 1, and includes flexible cable sections located at both sides of the swiveling wheel 1. The swiveling drive member is connected to the swiveling wheel 1 and is adapted to drive the swiveling wheel 1 to swivel. The mounting member 3 is provided with a guide rail 301 and is mounted with a first fixed pulley 6. The first-stage sliding rail 4 is adapted to slide upwards and downwards relative to the guide rail 301, and the first-stage sliding rail 4 is fixed to the support member 12. The flexible cable 2 wraps around the first fixed pulley 6, and the flexible cable sections of the flexible cable 2 located at both sides of the swiveling wheel 1 are connected to the first-stage sliding rail 4.

According to the lifting device in the embodiment of present application, the lifting and lowering of the support member 12 can facilitate the picking up and placing of objects, thereby avoiding muscle damage caused by the user’s bending and avoiding that the user is unable to reach the objects on the support member 12. In order to achieve the automatic lifting and lowering of the support member 12, it is only needed to additionally provide the swiveling wheel 1, the swiveling drive member, and the pulley (including fixed pulley, and can further including movable pulley, where the fixed pulley refers to at least one of the first fixed pulley 6, the second fixed pulley 10, the third fixed pulley, etc. in the absence of special limitation), which leads to small space occupation, simple structure and significantly decreased preparation cost. In addition, the device is conveniently disassembled since it is only needed to disassemble the swiveling wheel 1, the swiveling drive member and the fixed pulley.

Figure 3:
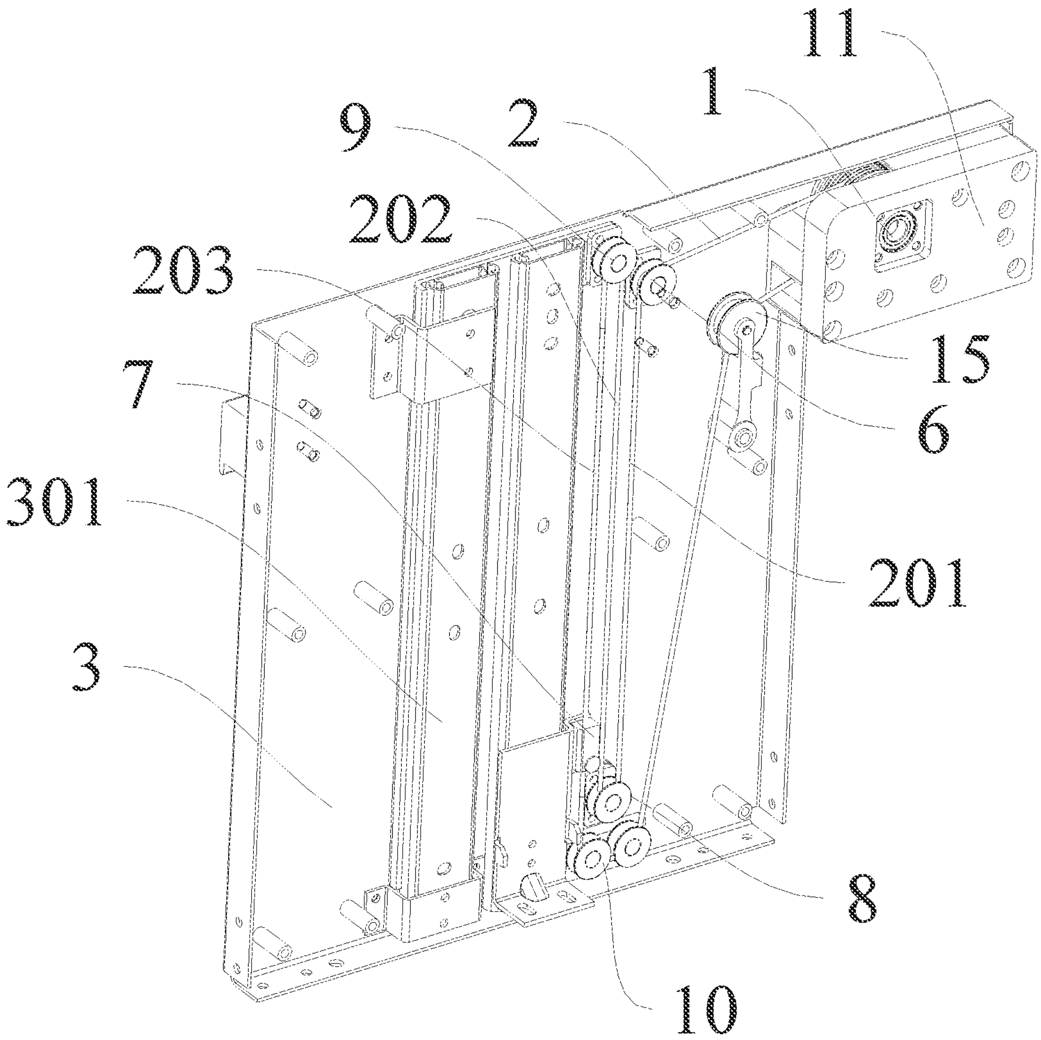
FIG. 3 is an axonometric schematic diagram of a lifting assembly in a retracted state according to an embodiment of the present application.
Figure 4:
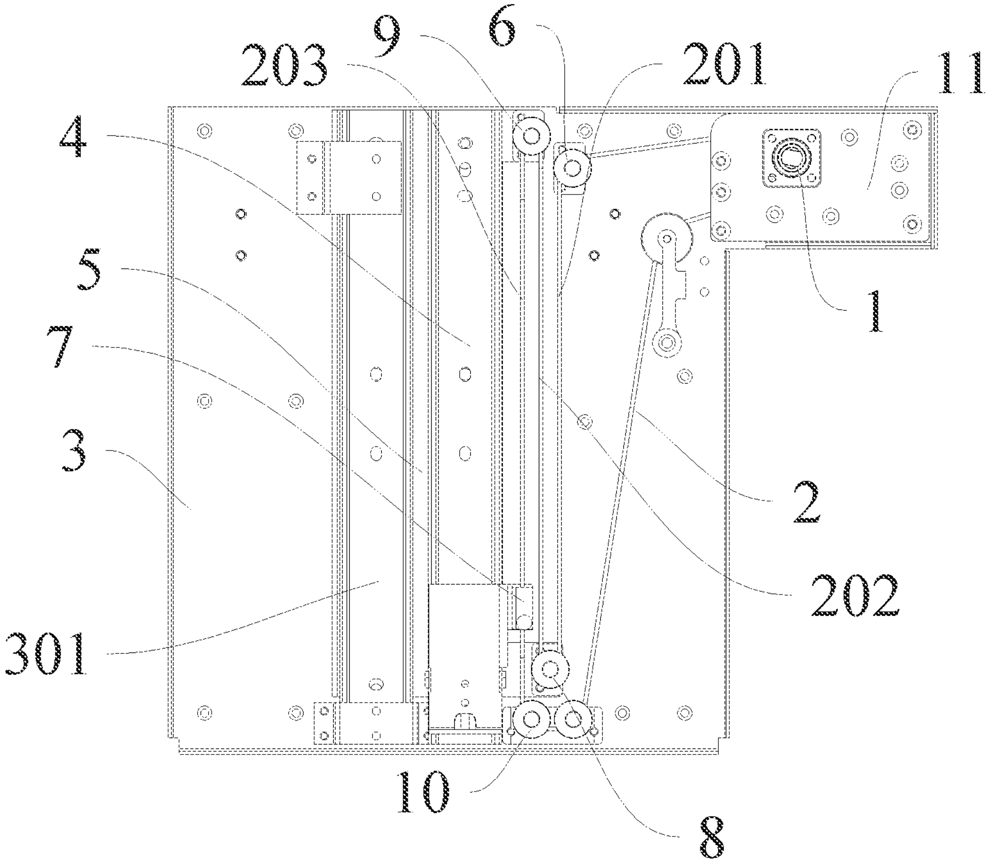
FIG. 4 is a schematic side diagram of a lifting assembly in a retracted state according to an embodiment of the present application.
Figure 5:
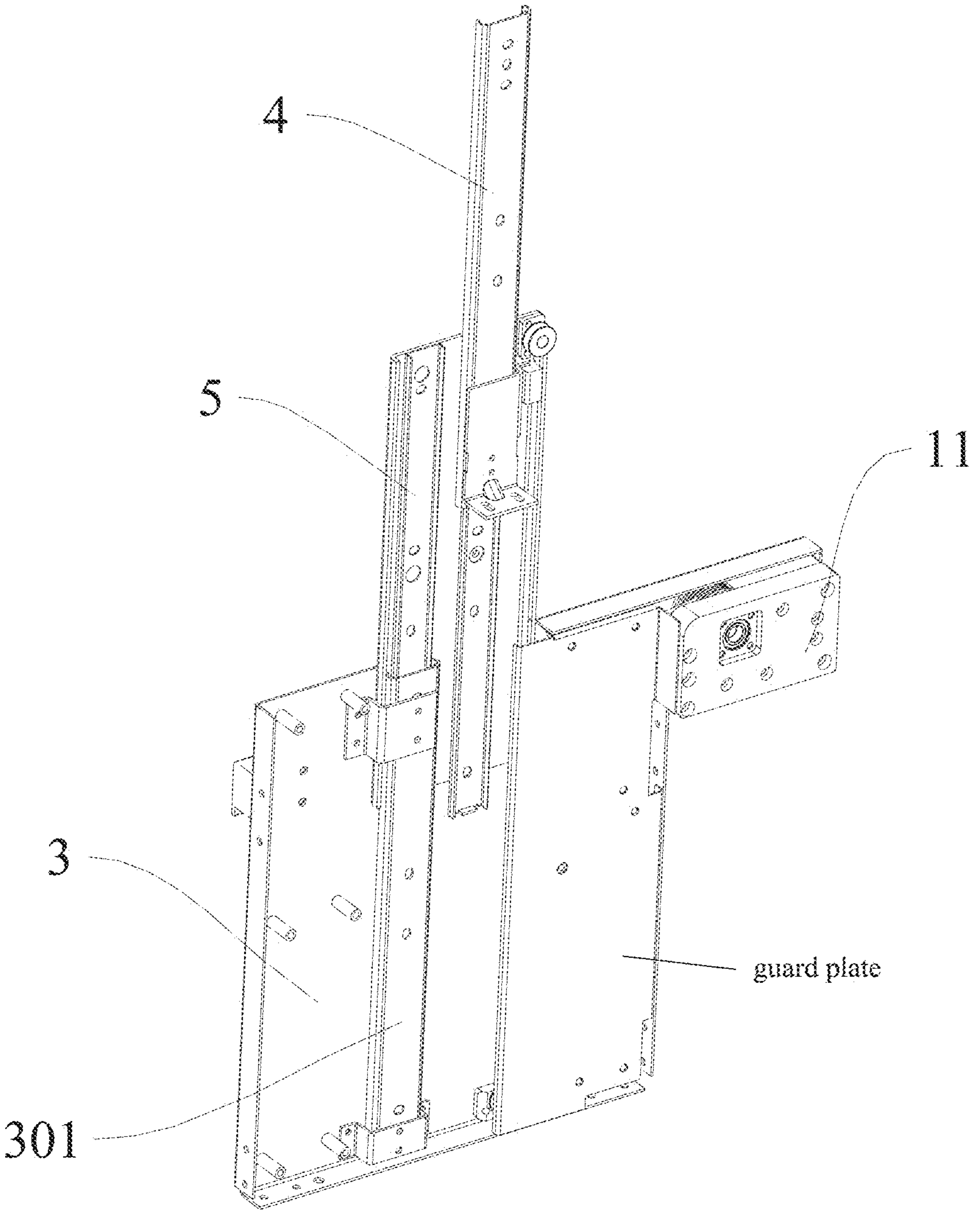
FIG. 5 is an axonometric schematic diagram of a lifting assembly in a stretched state according to an embodiment of the present application.
Figure 6:
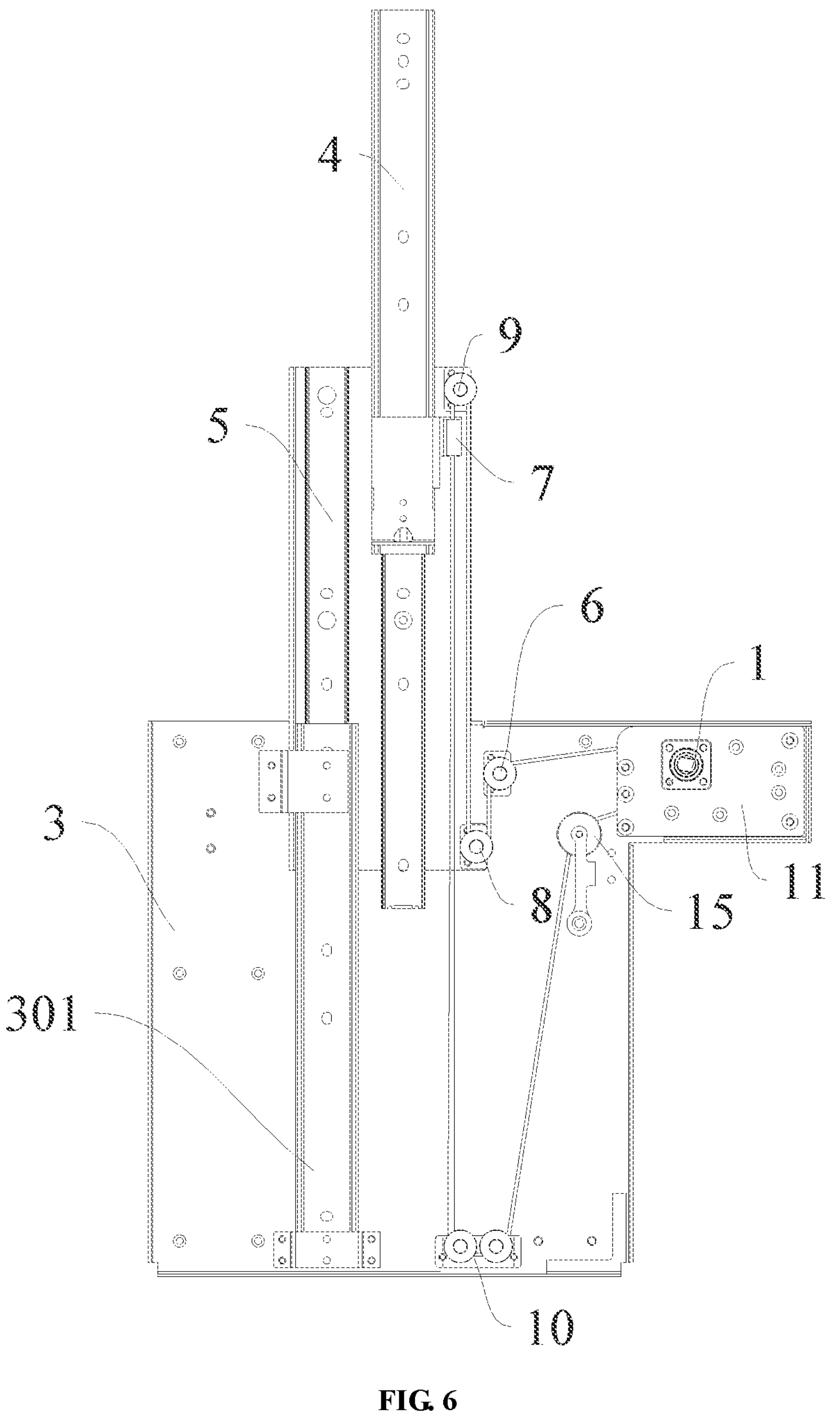
FIG. 6 is a schematic side diagram of a lifting assembly in a stretched state according to an embodiment of the present application.

According to the lifting device in the embodiment of the present application, the swiveling drive member of the lifting device can drive the swiveling wheel 1 to swivel, and then the swiveling wheel 1 drives the flexible cable 2 to move. On this basis, as the flexible cable 2 wraps around the first fixed pulley 6 and the flexible cable sections located on both sides of the swiveling wheel 1 are connected to the first-stage sliding rail 4, the flexible cable 2 can drive the first-stage sliding rail 4 to move in a straight line relative to the guide rail 301. With the different swivel directions of the swiveling wheel 1, the first-stage sliding rail 4 can be driven to move linearly in different directions relative to the guide rail 301. As shown in FIGS. 3 and 4, the swiveling wheel 1 swivels clockwise, and then the flexible cable 2 drives the first-stage sliding rail 4 to move toward the top direction shown in the figures relative to the guide rail 301. As shown in FIGS. 5 and 6, the swiveling wheel 1 swivels counter-clockwise, and then the flexible cable 2 drives the first-stage sliding rail 4 to move toward the bottom direction shown in the figures relative to the guide rail 301.

As shown in FIG. 5, the lifting assembly is provided with a guard plate. By providing the guard plate, almost all the pulleys are hidden by the guard plate when the lifting assembly is in a retracted state, and then the pulleys can be protected by the guard plate. According to an embodiment of the present application, the lifting assembly of the lifting device includes two states, that is, the retracted state and a stretched state. The retracted state refers to a state in which the first-stage sliding rail 4 is retracted downward relative to the guide rail 301 and thus the support member 12 is in the lowering position, which corresponds to FIGS. 3 and 4. The stretched state refers to a state in which the first-stage sliding rail 4 is stretched upward relative to the guide rail 301 and thus the support member 12 is in the lifting position, which corresponds to FIGS. 5 and 6. Accordingly, the support member 12 has two positions, which are the lowering position corresponding to FIGS. 7 and 8 and the lifting position corresponding to FIGS. 9 and 10.

According to an embodiment of the present application, the form of the guide rail 301 is not limited thereto, as long as the guide rail 30 can play a guiding role for the first-stage sliding rail 4 when the first-stage sliding rail 4 is mounted on the guide rail 301. For example, the guide rail 301 can include a guide slot, and then the first-stage sliding rail 4 can be lifted and lowered along the extending direction of the guide slot; or, the guide rail 301 can include a guide projection, and then the first-stage sliding rail 4 can be lifted and lowered along the extending direction of the guide projection. In an embodiment, the guide rail 301 can be integrally molded with the mounting member 3 or can be a separate member fixed to the mounting member 3.

Similarly, the structure of the first-stage sliding rail 4 is not limited thereto, as long as it can form a guide matching with the guide rail 301, so that the first-stage sliding rail 4 can be lifted and lowered relative to the guide rail 301. For example, the first-stage sliding rail 4 and the guide rail 301 can be matched through matched projections and grooves, or the first-stage sliding rail 4 and the guide rail 301 can be matched through sliding members mounted between the first-stage sliding rail 4 and the guide rail 301, such as pulleys.

The first-stage sliding rail 4 can be a separate part or can be integrally formed on the support member (the specific form of the support member includes the drawer body or shelves, etc.), and then a position on the support member 12 for mounting in the guide rail 301 can be seen as the first-stage sliding rail 4.

In an embodiment, an intermediate sliding rail can be mounted between the first-stage sliding rail 4 and the guide rail 301, and the intermediate sliding rail can be provided with movable pulleys, where the movable pulleys refer to the first movable pulley 8 and the second movable pulley 9 provided on the second-stage sliding rail 5 in the absence of special limitation; or, in the case of including more intermediate sliding rail, the movable pulleys further include the movable pulleys provided on other intermediate sliding rails. The flexible cable is provided to wrap around the first fixed pulley 6 and the movable pulleys, to drive the first-stage sliding rail 4 to move upwards and downwards relative to the intermediate sliding rail and drive the intermediate sliding rail to move upwards and downwards relative to the guide rail 301. The number of intermediate sliding rails is not limited herein. When the number of intermediate sliding rail is 1, the intermediate sliding rail refers to the second-stage sliding rail 5. When the number of intermediate sliding rails is 2, the intermediate sliding rails include the second-stage sliding rail 5 and a third-stage sliding rail. When the number of intermediate sliding rails is 3, the intermediate sliding rails include the second-stage sliding rail 5, the third-stage sliding rail and a fourth-stage sliding rail, and so on. In case of providing the intermediate sliding rails, the first-stage sliding rail 4 is mounted on the guide rail 301 through the second-stage sliding rail 5, the third-stage sliding rail and other intermediate sliding rails instead of being directly mounted on the guide rail 301. Taking the lifting device including the second-stage sliding rail 5 as an example, the second-stage sliding rail 5 can match with the guide rail 301 and can move in a straight line along the guide rail 301, and the first-stage sliding rail 4 can match with the second-stage sliding rail 5 and can move in a straight line along the second-stage sliding rail 5.

According to an embodiment of the present application, in case that the lifting device includes the second-stage sliding rail 5, the second-stage sliding rail 5 is mounted on the guide rail 301 and adapted to slide along the guide rail 301 to achieve lifting and lowering. The second-stage sliding rail 5 is provided with the first movable pulley 8 and the second movable pulley 9, the first-stage sliding rail 4 is mounted on the second-stage sliding rail 5 and is adapted to move relative to the second-stage sliding rail 5 to achieve lifting and lowering, and the flexible cable 2 successively wraps around the first fixed pulley 6, the first movable pulley 8 and the second movable pulley 9.

According to an embodiment of the present application, when the lifting device includes both the first-stage sliding rail 4 and the second-stage sliding rail 5, the lifting device can achieve two stages of retraction, corresponding to three stages of lifting/lowering. In an embodiment, the lifting device can further include a three-stage sliding rail, a four-stage sliding rail, a five-stage sliding rail, etc. The number of the sliding rails is not limited and it can be set according to actual need, where the sliding rail refers to at least one of the first-stage sliding rail 4, second-stage sliding rail 5, third-stage sliding rail, etc. in the absence of special limitation. In an embodiment, the first-stage sliding rail 4 refers to a first sliding rail driven by the swivel of the swiveling drive member to achieve retraction or stretching. The second-stage sliding rail 5 refers to a second sliding rail driven by the continuous swivel of the swiveling drive member to achieve retraction or stretching after the first-stage sliding rail 4 moves to a limit position. The third-stage sliding rail refers to a third sliding rail driven by the continuous swivel of the swiveling drive member to achieve retraction or stretching after the second-stage sliding rail 5 moves to a limit position and so on.

According to an embodiment of the present application, the lifting device further includes a slider 7 fixed to the first-stage sliding rail 4 and adapted to move in a straight line along the second-stage sliding rail 5, where the slider 7 fixedly connects the flexible cable sections located at both sides of the swiveling wheel 1. The method of fixing the slider 7 and the flexible cable sections is not limited thereto, for example, the slider 7 and the flexible cable sections can be bound together, or the slider 7 and the flexible cable sections can be welded together. By providing the slider 7, it can facilitate the assembly between the first-stage sliding rail 4 and the second-stage sliding rail 5, and can facilitate the providing of the flexible cable 2. It is also possible not to provide the slider 7, and the flexible cable sections on both sides of the swiveling wheel 1 can be directly connected to the first-stage sliding rail 4.

According to an embodiment of the present application, along the stretching direction of the first-stage sliding rail 4 relative to the second-stage sliding rail 5, the slider 7 is fixed to the rear end of the first-stage sliding rail 4. For example, as shown in the FIGS. 3 and 4, the slider 7 is fixed to the lower part of the first-stage sliding rail 4. In this case, a movement distance of the first-stage sliding rail 4 relative to the second-stage sliding rail 5 can be ensured. It is also possible to provide the slider 7 at other positions of the first-stage sliding rail 4 in case that the movement distance of the first-stage sliding rail 4 meets the demand.

According to an embodiment of the present application, the first movable pulley 8 and the second movable pulley 9 are located at two ends of the second-stage sliding rail 5 respectively to ensure the movement distance of the second-stage sliding rail 5 relative to the guide rail 301. As shown in FIGS. 3 and 4, the first movable pulley 8 is provided at a lower end of the second-stage sliding rail 5 and the second movable pulley 9 is provided at an upper end of the second-stage sliding rail 5. It is also possible to provide the first movable pulley 8 and the second movable pulley 9 at other positions of the second-stage sliding rail 5 in case that the movement distance of the second-stage sliding rail 5 meets the requirement.

According to an embodiment of the present application, the flexible cable 2 includes a first flexible cable section 201, a second flexible cable section 202 and a third flexible cable section 203. The first flexible cable section 201 is located between the first fixed pulley 6 and the first movable pulley 8, the second flexible cable section 202 is located between the first movable pulley 8 and the second movable pulley 9, and the third flexible cable section 203 is located between the second movable pulley 9 and the first-stage sliding rail 4 (e.g., between the second movable pulley 9 and the slider 7 of the first-stage sliding rail 4). In order to ensure smooth operation of the flexible cable 2 and to save the power of the swiveling drive member under the same conditions, the first flexible cable section 201, the second flexible cable section 202 and the third flexible cable section 203 can be arranged in parallel. In another embodiment, the first flexible cable section 201, the second flexible cable section 202 and the third flexible cable section 203 can be arranged at an angle to each other.

According to an embodiment of the present application, the lifting device further includes a second fixed pulley 10 provided on the mounting member 3. By providing the second fixed pulley 10, the arrangement of the swiveling wheel 1 can be more flexible.

As shown in FIGS. 3 to 6, the flexible cable sections located on both sides of the swiveling wheel 1 include flexible cable sections stretching from the upper side of the swiveling wheel 1 and flexible cable sections stretching from the lower side of the swiveling wheel 1. The flexible cable sections stretching from the upper side of the swiveling wheel 1 include a flexible cable section between the swiveling wheel 1 and the first fixed pulley 6, and further include the first flexible cable section 201, the second flexible cable section 202 and the third flexible cable section 203 mentioned above. The flexible cable sections stretching from the lower side of the swiveling wheel 1 include a flexible cable section between the swiveling wheel 1 and the second fixed pulley 10 and a flexible cable section between the second fixed pulley 10 and the first-stage sliding rail 4.

When the swiveling wheel 1 swivels clockwise, the flexible cable section located between the swiveling wheel 1 and the first fixed pulley 6 moves to the right and drives the first fixed pulley 6 to swivel clockwise; the first flexible cable section 201 moves upward and drives the first movable pulley 8 to swivel counterclockwise; the second flexible cable section 202 moves downward and drives the second movable pulley 9 to swivel clockwise; the third flexible cable section 203 moves upward and drives the first-stage sliding rail 4 to move upward through the slider 7. When the first-stage sliding rail 4 moves upward to the limit position, at this time if the swiveling wheel 1 continue to swivel clockwise, the first flexible cable section 201 continue to move upward and drives the first movable pulley 8 to move upward, and thus the second-stage sliding rail 5 is driven to move upward relative to the guide rail 301. When the first-stage sliding rail 4 moves upward, the flexible cable section between the second movable pulley 9 and the slider 7 becomes shorter and the flexible cable section between the slider 7 and the second fixed pulley 10 becomes longer. When the second-stage sliding rail 5 moves upward, the flexible cable section between the first fixed pulley 6 and the first movable pulley 8 becomes shorter and the flexible cable section between the slider 7 and the second fixed pulley 10 continues to become longer.

When the swiveling wheel 1 swivels counterclockwise, the flexible cable section between the swiveling wheel 1 and the second fixed pulley 10 moves upward and drives the second fixed pulley 10 to move counterclockwise; the flexible cable section between the second fixed pulley 10 and the first-stage sliding rail 4 moves downward and drives the first-stage sliding rail 4 to move downward through the slider 7. When the first-stage sliding rail 4 moves downward to the limit position, if the swiveling wheel 1 continue to swivel clockwise, the third flexible cable section 203 moves downward and drives the second movable pulley 9 to move downward because the flexible cable section between the second fixed pulley 10 and the first-stage sliding rail 4 continues to move downward, and thus the second-stage sliding rail 5 is driven to move downward. When the first-stage sliding rail 4 moves downward, the flexible cable section between the second movable pulley 9 and the slider 7 becomes longer and the flexible cable section between the slider 7 and the second fixed pulley 10 becomes shorter. When the second-stage sliding rail 5 moves downward, the flexible cable section between the first fixed pulley 6 and the first movable pulley 8 becomes longer and the flexible cable section between the slider 7 and the second fixed pulley 10 continues to become shorter.

According to an embodiment of the present application, the swiveling wheel 1 is provided on the mounting member 3. In this case, it can ensure that all the components of the lifting device are concentrated as much as possible, and ensure that it is easy to disassemble and assemble. In an embodiment, the swiveling wheel 1 can be provided on other positions, as long as the swiveling drive member can drive the flexible cable 2 to move through the swiveling wheel 1. Similarly, there is no restriction on the position of the swiveling drive member.

According to an embodiment of the present application, taking the swiveling drive member being motor 13 as an example, the motor 13 does not need to move with the movement of the sliding rail, thus avoiding the movable bending of the wire of the motor 13.

In an embodiment, the lifting device includes both the first fixed pulley 6, the first movable pulley 8 and the second movable pulley 9, and the flexible cable 2 is provided to successively wrap around the first fixed pulley 6, the first movable pulley 8, the second movable pulley 9 and the second fixed pulley 10. Since the lifting device includes the second fixed pulley 10, and thus the arrangement of the swiveling wheel 1 is more flexible, for example, the swiveling wheel 1 can be provided outside the mounting member 3. When the lifting device is mounted on the drawer body, the mounting positions of the swiveling wheel 1 and the swiveling drive member relative to the drawer body can be selected as needed. In an embodiment, even if the lifting device includes the second fixed pulley 10, it is also possible to provide the swiveling wheel 1 and the swiveling drive member on the mounting member 3.

In conjunction with FIGS. 3 and 4, the first fixed pulley 6 and the second fixed pulley 10 of the lifting device are used to guide and limit the flexible cable 2 (such as the flexible cable sections) on both sides of the swiveling wheel 1 respectively. In an embodiment, the mounting member 3 includes a mounting plate, the first fixed pulley 6 corresponding to a first end (i.e., the upper end in FIGS. 3 and 4) of the guide rail 301 is provided on the mounting plate, and the second fixed pulley 10 corresponding to a second end (i.e., the lower end in FIGS. 3 and 4) of the guide rail 301 is provided on the mounting plate. The swiveling wheel 1 is fixed to the top of the mounting plate through the fixing member 11. The figures only give one of the ways of providing the pulleys, and the specific way of providing the pulleys is not limited by the attached figures, as long as the flexible cable 2 is provided to wrap around the first movable pulley 8 after passing the first fixed pulley 6, and the flexible cable 2 returns to the swiveling wheel 1 after passing the second fixed pulley 10.

In an embodiment, in order to ensure the tension of the flexible cable 2 between the second fixed pulley 10 and the swiveling wheel 1, the lifting device can include a tension pulley 15 (as shown in FIG. 3). In this embodiment, the tension pulley 15 is provided between the swiveling wheel 1 and the second fixed pulley 10 along a stretching direction of the flexible cable 2. In another embodiment, in order to ensure the tension of the flexible cable 2, the tension pulley 15 can be provided at other locations along the stretching direction of the flexible cable 2.

As shown in FIGS. 3 to 10, the swiveling wheel 1 is fixed to the top of the mounting member 3 through the fixing member 11. It should be noted that the location of the swiveling wheel 1 is not limited by the examples given here.

According to an embodiment of the present application, the second fixed pulley 10 may not be provided.

Figure 11:
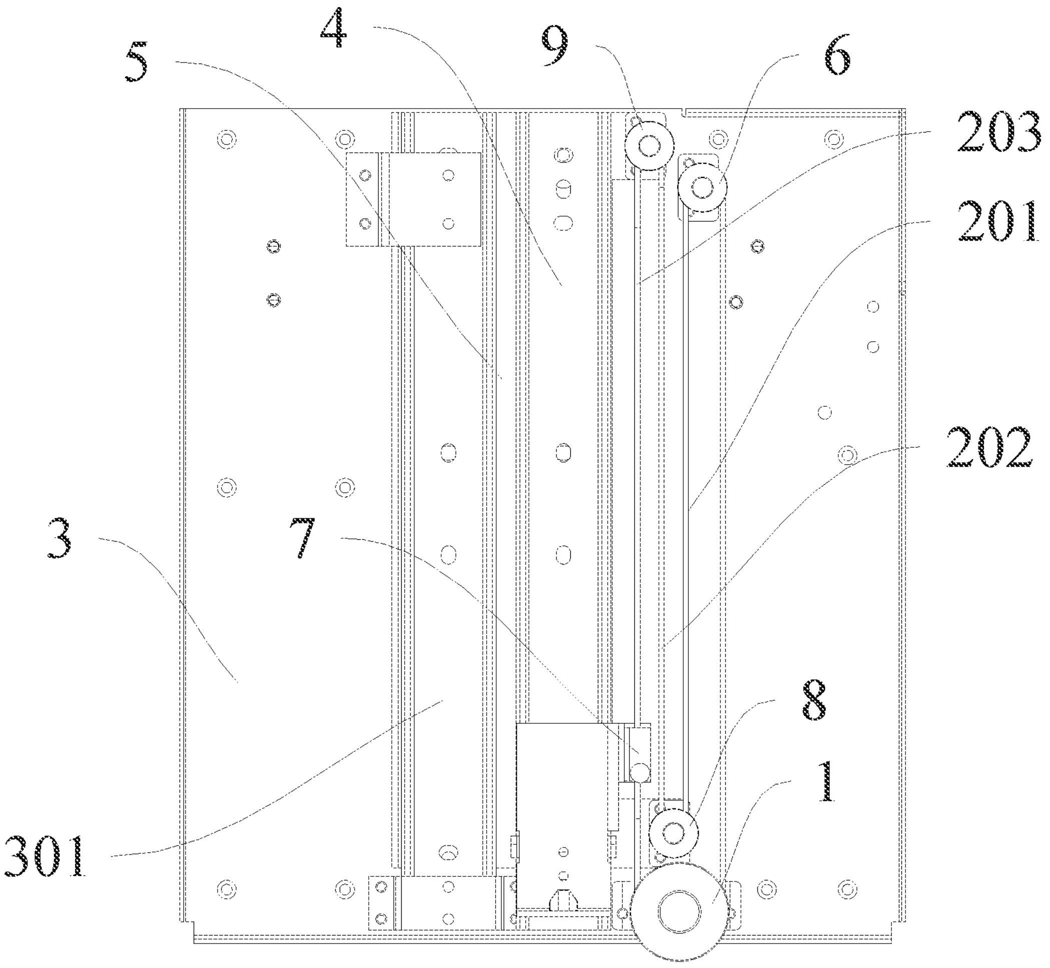
FIG. 11 is a schematic side diagram of a lifting assembly excluding a second fixed pulley according to an embodiment of the present application.

According to a further embodiment of the present application, referring to FIG. 11, the first fixed pulley 6 is provided on the mounting plate corresponding to the first end of the guide rail 301, and the swiveling wheel 1 is provided on the mounting plate corresponding to the second end of the guide rail 301 (i.e., the lower end of the guide rail 301 in FIG. 11). In the case that the lifting assembly includes the second-stage sliding rail 5 and the first movable pulley 8 and the second movable pulley 9 provided on the second-stage sliding rail 5, the swiveling wheel 1 is provided corresponding to the first fixed pulley 6, the first movable pulley 8 and the second movable pulley 9, and the diameter of the swiveling wheel 1 is larger than that of the first fixed pulley 6, the first movable pulley 8 and the second movable pulley 9. In this case, "the swiveling wheel 1 is provided corresponding to the first fixed pulley 6, the first movable pulley 8 and the second movable pulley 9" means that the swiveling wheel 1 is located on the straight line formed by the first movable pulley 8 and the second movable pulley 9, or a distance between the straight line formed by the first movable pulley 8 and the second movable pulley 9 and the swiveling wheel 1 is small, and thus the smooth movement of the flexible cable 2 can be ensured. In addition, the diameter of the swiveling wheel 1 is larger than that of the first movable pulley 8 and the second movable pulley 9, which can ensure that the flexible cable sections located on both sides of the swiveling wheel 1 can be tangential to the swiveling wheel 1 to further ensure the smooth movement of the flexible cable 2.

According to an embodiment of the present application, the swiveling wheel 1 is a synchronous belt wheel or pulley, and the flexible cable 2 is a belt or a flexible belt with a high friction coefficient. For example, the swiveling wheel 1 can be a belt wheel and the flexible cable 2 can be a belt matched with the belt wheel. In this case, it can ensure that the swivel of the swiveling wheel 1 drives the flexible cable 2 to move and avoid slipping of the flexible cable 2 relative to the swiveling wheel 1. The specific forms of the swiveling wheel 1 and flexible cable 2 are not limited, as long as the swivel of the swiveling wheel 1 can drive the flexible cable 2 to move. Similarly, the specific structure of the flexible cable 2 is not limited, for example, it can be steel wire rope.

According to an embodiment of the present application, the swiveling drive member may be, but not limited to, the motor 13 (including a linear motor 13 and a swiveling motor 13), as long as the swiveling drive member can be used as a power source to drive the swiveling wheel 1 to swivel. For example, the swiveling drive member can be a pneumatic cylinder, and the pneumatic cylinder can convert linear motion into swivel of the swiveling wheel 1 by means of a rack and pinion pair.

According to an embodiment of the present application, the lifting assembly is provided in pairs on both sides of the support member 12. For example, one pair, two pairs, three pairs of lifting assemblies can be provided on both sides of the support member 12. By providing the lifting assembly in multiple pairs, the support member 12 can be supported and lifted smoothly.

Figure 7:
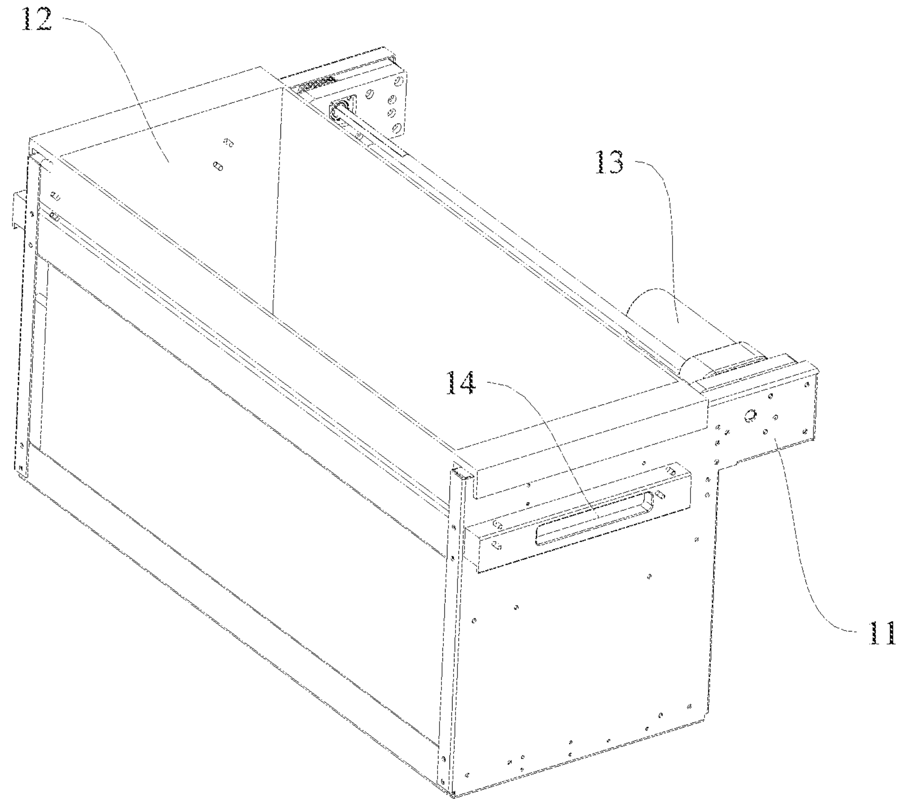
FIG. 7 is an axonometric schematic diagram of a lifting device in which a support member is in a lowering position according to an embodiment of the present application.
Figure 8:
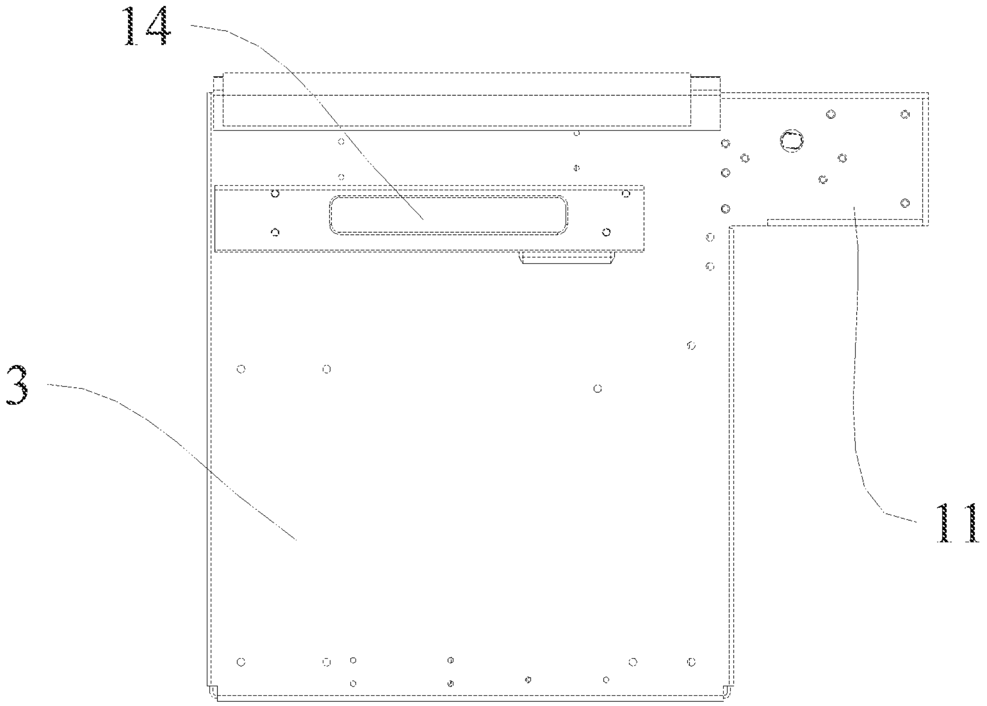
FIG. 8 is a schematic side diagram of a lifting device in which a support member is in a lowering position according to an embodiment of the present application.
Figure 9:
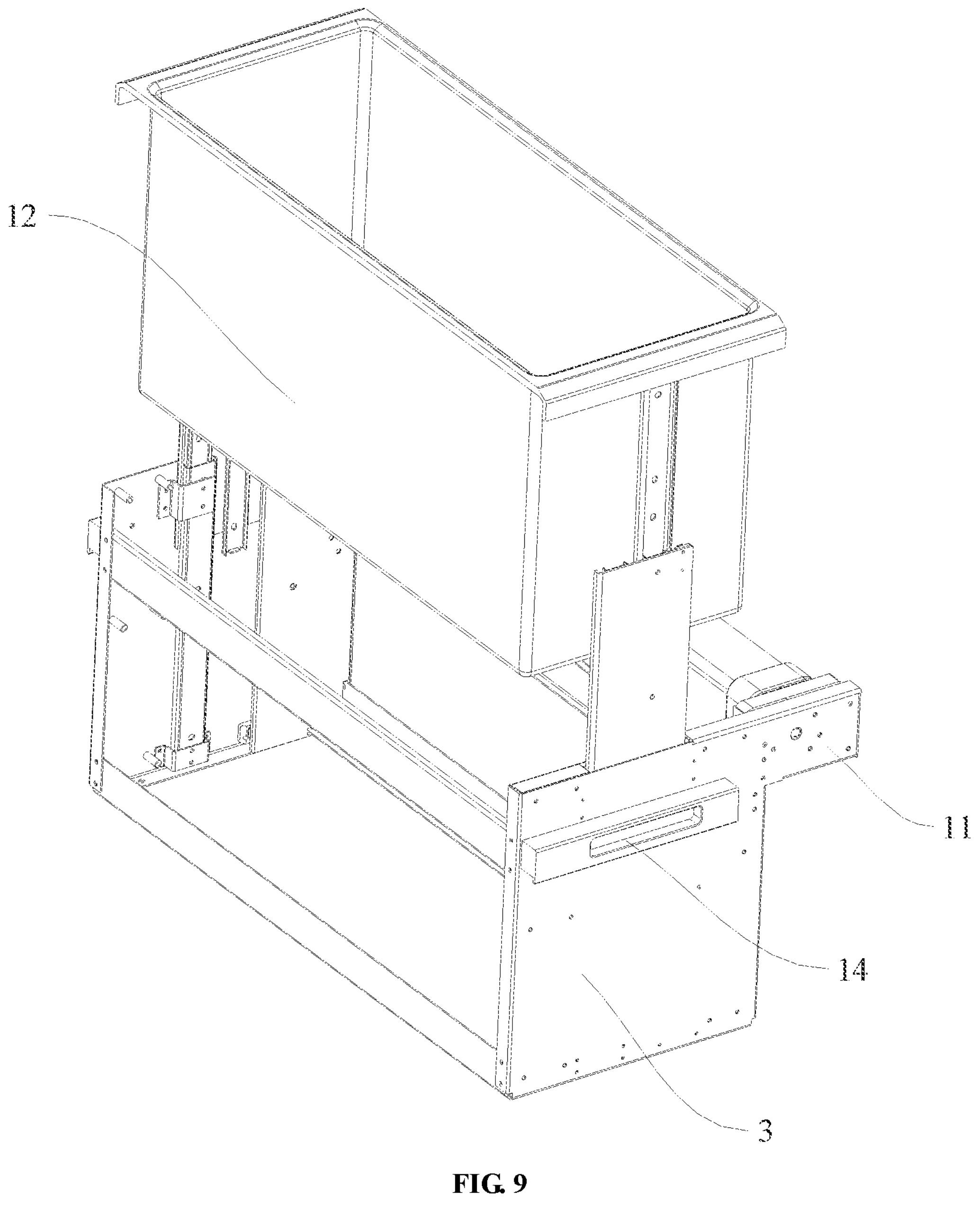
FIG. 9 is an axonometric schematic diagram of a lifting device in which a support member is in a lifting position according to an embodiment of the present application.
Figure 10:
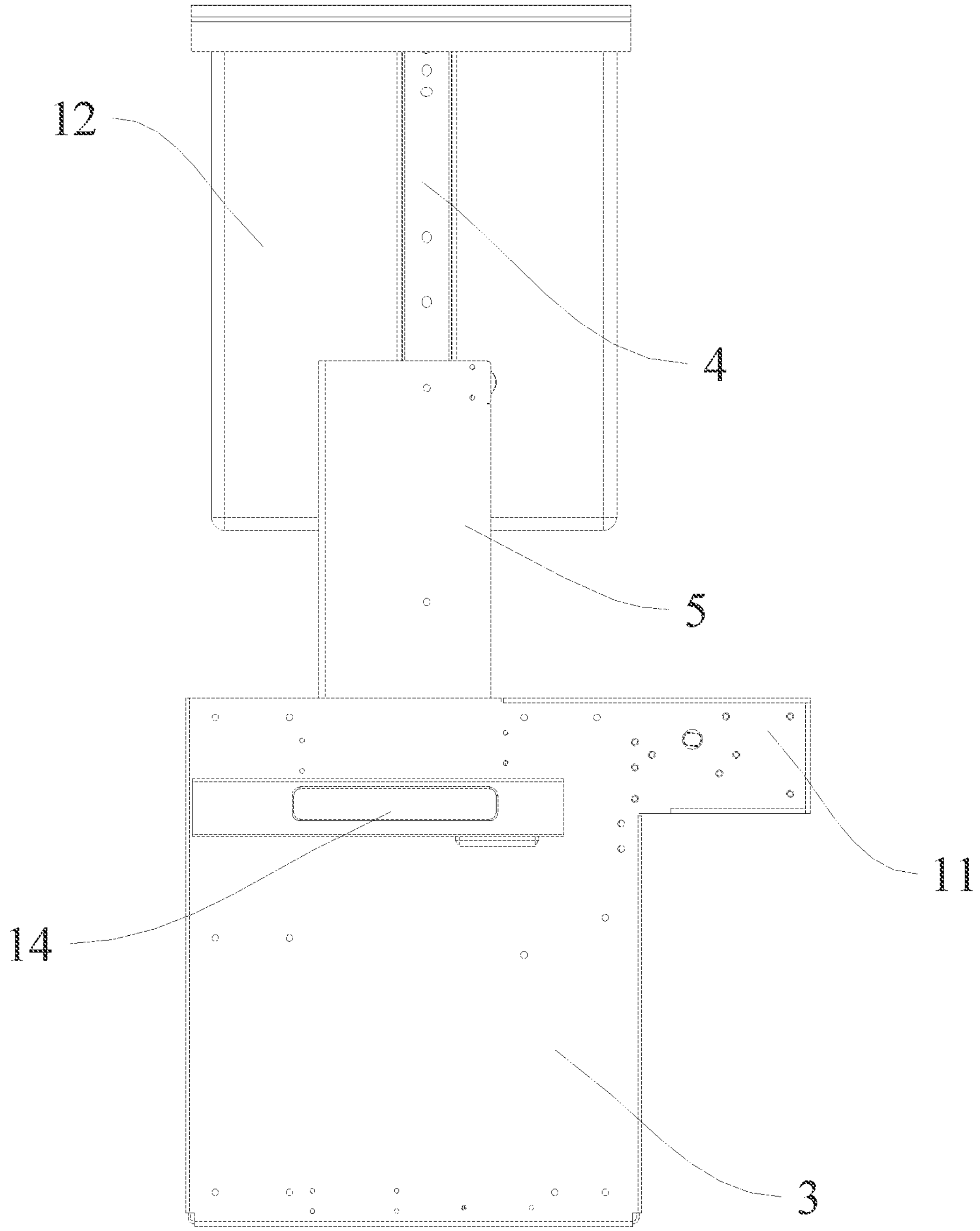
FIG. 10 is a schematic side diagram of a lifting device in which a support member is in a lifting position according to an embodiment of the present application.

According to an embodiment of the present application, one pair of lifting assemblies includes a first lifting assembly and a second lifting assembly. The first lifting assembly is provided at a first side of the support member 12 and includes a first swiveling wheel. The second lifting assembly is provided at a second side of the support member 12 and includes a second swiveling wheel, where the second side is opposite to the first side, and both the first swiveling wheel and the second swiveling wheel are connected to the same swiveling drive member. In this case, the first lifting assembly and the second lifting assembly are lifted and lowered synchronously to ensure the smoothness of the support member 12. Referring to FIGS. 7 and. 9, the swiveling drive member is a motor, and the motor is connected to both the first swiveling wheel and the second swiveling wheel, which can ensure the smoothness of the support member during the lifting and lowering process.

According to an embodiment of the present application, the support member 12 is a drawer body or a shelf. When the support member 12 is a drawer body, the lifting device is a lifting drawer. When the support member 12 is a shelf, the lifting device is a lifting shelf.

According to an embodiment of the present application, referring to FIGS. 7 to 10, the mounting members 3 of the first lifting assembly and the second lifting assembly are fixed. In this case, an accommodation space for the support member 12 is formed between the two mounting members 3. When the lifting device is lifting drawer, an accommodation space for the drawer body is formed between the two mounting members 3. A hand-clasping slot 14 or a knob can be provided outside the mounting members 3 (i.e., the side that backs up to the accommodation space) to facilitate overall movement of the lifting drawer.

According to an embodiment of the present application, the swiveling drive member drives the swiveling wheel 1 to swivel and then drive the flexible cable 2 to move, to make the first-stage sliding rail 4 slide relative to the guide rail 301. Further, when the drawer body is mounted on the first-stage sliding rail 4, the drawer body can move relative to the mounting member 3, to realize the automatic lifting and lowering of the drawer.

According to an embodiment of the present application, there is provided a storage cabinet including a box body, and further including the lifting device as described above. In this embodiment, the mounting member 3 of the lifting device is provided in the box body.

According to the storage cabinet in the embodiments of the present application, the automatic lifting and lowering of the lifting device can facilitate the picking and placing of objects in the storage cabinet. In addition, the lifting assembly of the lifting device occupies little space and has a simple structure, which almost does not occupy additional space inside the box body. In addition, the lifting device is low in preparation cost and convenient to disassemble and assemble, and thus it is strong in its applicability, and can be applied to various products such as refrigerators, closets, display cabinets, etc.

The mounting member 3 can be a detachable separate component mounted in the box body, and the mounting member 3 can also be integrally molded in the box body.

According to the storage cabinet in the embodiments of the present application, the swiveling wheel 1 is mounted inside of the storage cabinet. The swiveling wheel 1 will generate certain noise when moving, and the noise coming from the storage cabinet can be reduced by mounting the swiveling wheel 1 inside the storage cabinet. The "inside of the storage cabinet" refers to the side far from the door body, while the side near the door body refers to outside of the storage cabinet. In actual application, the "inside of the storage cabinet" is also the side far from the user. For example, as shown in FIGS. 3 to 10, the swiveling wheel 1 is provided on the back side of the support member 12 through the fixing member 11, thus reducing the noise of the storage cabinet during use and not affecting the aesthetic when opening the door of the storage cabinet.

According to the storage cabinet in the embodiments of the present application, the storage cabinet can be a refrigerator, a retail cabinet or a display cabinet, where the specific form of the storage cabinet is not limited by the examples given here.

In the related art, when the storage cabinet is a refrigerator, it is very inconvenient for a user to pick or place freezing foods because the freezing foods are always placed in the freezing drawer provided at bottom of the refrigerator.

According to an embodiment of the present application, the automatic lifting and lowering of the lifting device can be controlled by providing a corresponding switch or sensor. For example, the lifting device or the storage cabinet with the lifting device can be provided with a switch, and thus the lifting and lowering of the support member 12 can be controlled by the switch. For example, the support member 12 is automatically lifted by pressing the switch and the support member 12 is automatically lowered by pressing the switch again. For another example, the storage cabinet is provided with a sensor, and a signal is generated to control the lifting or lowering of the support member 12 when the sensor senses a corresponding action, such as human hand being close to the storage cabinet.

For example, in a refrigerator, the sensor can be provided on a corresponding position of the refrigerator, and when the corresponding action is sensed continuously by the sensor, the swiveling drive member will operates continuously to drive the drawer body or shelf of the refrigerator to lift gradually. When the corresponding action disappears, the swiveling drive member will not operate anymore, and the drawer body or shelf will stop at the current position. For example, a pressure sensor is provided on the drawer body, door body or a box liner, and the swiveling drive member drives the swiveling wheel 1 to swivel continuously based on the press action, and then to drive the drawer body or shelf to be lowered. For another example, the pressure sensor can be replaced by an infrared sensor or other types of sensors. When the drawer body or shelf is needed to be lowered, the continuous sensing is not essential, only one action can trigger the lowering of the drawer body or shelf. The lifting device can also be controlled based on the sound signal. For example, the state of the drawer body can be switched based on voice information such as "lifting the drawer" or "lowering the drawer". In an embodiment, the lifting device can be controlled based on the sound signal. For example, the state of the shelf can be switched based on voice information such as "lifting the shelf" or "lowering the shelf".

Lifting or lowering the lifting device can also be controlled based on other signal inputs. For example, the storage cabinet can be equipped with the corresponding remote control, the remote control includes lifting or lowering operation button and other operating buttons, and then the control of the lifting or lowering of the lifting device can be realized based on buttons of the remote control. In an embodiment, corresponding buttons may be provided on the door of the storage cabinet and it is possible to control the lifting or lowering of the lifting device before opening the door. For another example, it may be possible to control the lifting or lowering of the lifting device through a mobile APP.

The lifting device in the embodiments of the present application is described in detail below in conjunction with FIGS. 3 to 10.

The refrigerator includes a drawer body located at the bottom of a freezing compartment of the refrigerator. In order to facilitate picking and placing objects in the drawer body, the drawer body is mounted in the box liner of the refrigerator through the lifting assembly. As shown in FIGS. 7 to 10, the two lifting assemblies include a mounting member on one side and another mounting member on the other side. The two mounting members are connected to each other through a connecting rod, connecting plate, or other form of connection to form an accommodation space for the drawer body. In an embodiment, the swiveling drive member, the sliding rail and the swiveling wheel 1 of each lifting assembly are mounted inside the mounting member 3, and thus the other components of the lifting assembly can be seen from outside except the mounting member 3. In this case, it not only ensures the aesthetic of the lifting device, but also protects the lifting assembly and prevents sundries from affecting the normal operation of the lifting assembly.

In an embodiment, the first-stage sliding rail 4 can be fixed to both sides of the drawer body, and thus stable support for the drawer body is realized. The slide groove for the second-stage sliding rail 5 can be formed between the guide rail 301 and the mounting member 3, and then the structural strength of the second-stage sliding rail 5 and the stability of operation can be ensured when the second-stage sliding rail 5 moves relative to the mounting member 3.

When the lifting assembly is in a contracted state, the drawer body is retracted to the accommodation space between the two mounting members, and the top of the drawer body is roughly flush with the top of the mounting members. In this case, it can ensure the aesthetic and normal use of the lifting drawer. When the lifting assembly is in the stretched state, the drawer body stretches outside the accommodation space, and the first-stage sliding rail 4 and the second-stage sliding rail 5 can be in their respective limit positions to allow the drawer body to move to the highest position. In an embodiment, only the first-stage sliding rail 4 is in the limit position, or alternatively, the first-stage sliding rail 4 is only partially stretched and the second-stage sliding rail 5 is in its original position. The states of the first-stage sliding rail 4 and second-stage sliding rail 5 can be adjusted as appropriate to achieve the position adjustment of the drawer body.

In an embodiment, a hand-clasping slot is provided outside the mounting member and can facilitate the handling of the lifting assembly. The hand-clasping slot occupies little space compared to the knob structure, thus avoiding waste of the space inside the refrigerator.

In the case of providing a set of lifting assembly, the second-stage sliding rail 5 can be provided in the middle of the mounting plate to ensure that the force on the mounting plate is even. In addition, the first-stage sliding rail 4 can also be provided in the middle of the side wall of the drawer.

The implementations above are only used to illustrate the present application, but not to limit the present application. Although the present application has been described in detail with reference to the embodiments, those skilled in the art should understand that various combinations, modifications, or equivalent replacements of the solutions of the present application do not depart from the scope of the solutions of the present application, and should all covered by the scope of the claims of the present application.

What is claimed is:

1. A lifting device, comprising:

a support member and a lifting assembly, wherein the lifting assembly comprises a swiveling wheel, a swiveling drive member, a mounting member and a first-stage sliding rail, a flexible cable is provided to wrap around the swiveling wheel and moves with swivel of the swiveling wheel, and the flexible cable comprises flexible cable sections located on both sides of the swiveling wheel, the swiveling drive member is connected to the swiveling wheel and is adapted to drive the swiveling wheel to swivel, the mounting member is provided with a guide rail and a first fixed pulley, the first-stage sliding rail is adapted to slide upwards and downwards relative to the guide rail, and the first-stage sliding rail is fixed to the support member, the flexible cable is provided to wrap around the first fixed pulley, and the flexible cable sections of the flexible cable located on both sides of the swiveling wheel are connected to the first-stage sliding rail; and the lifting assembly is provided with a guard plate, the first fixed pulley being protected by the guard plate when the lifting assembly is in a retracted state; wherein one or more intermediate sliding rails are provided between the first-stage sliding rail and the guide rail, the first-stage sliding rail is mounted on the guide rail through the intermediate sliding rails, the intermediate sliding rails are provided with movable pulleys, and the flexible cable is provided to successively wrap around the first fixed pulley and the movable pulleys;

the intermediate sliding rails comprise: a second-stage sliding rail mounted on the guide rail and adapted to slide along the guide rail, the second-stage sliding rail is provided with a first movable pulley and a second movable pulley, and the first-stage sliding rail is mounted on the second-stage sliding rail and is adapted to move relative to the second-stage sliding rail; and the flexible cable is provided to wrap around the first fixed pulley, the first movable pulley and the second movable pulley successively; the first movable pulley is located at a lower end of the second-stage sliding rail and the second movable pulley is located at an upper end of the second-stage sliding rail.

2. The lifting device of claim 1, wherein the lifting assembly further comprises:

a slider, fixed to the first-stage sliding rail and adapted to move in a straight line along the second-stage sliding rail, wherein the slider is fixedly connected to the flexible cable sections located on both sides of the swiveling wheel.

3. The lifting device of claim 2, wherein the slider is fixed to a lower part of the first-stage sliding rail.

4. The lifting device of claim 1, wherein the flexible cable comprises:

a first flexible cable section, provided between the first fixed pulley and the first movable pulley, a second flexible cable section, provided between the first movable pulley and the second movable pulley, and a third flexible cable section, provided between the second movable pulley and the first-stage sliding rail, wherein the first flexible cable section, the second flexible cable section and the third flexible cable section are arranged in parallel.

5. The lifting device of claim 1, wherein the lifting assembly further comprises:

a second fixed pulley, provided on the mounting member, wherein the mounting member comprises a mounting plate, wherein the first fixed pulley corresponding to a first end of the guide rail is provided on the mounting plate, the second fixed pulley corresponding to a second end of the guide rail is provided on the mounting plate, and the guide rail is fixed to the mounting plate.

6. The lifting device of claim 5, further comprising:

a tension pulley, provided between the swiveling wheel and the second fixed pulley along an extending direction of the flexible cable.

7. The lifting device of claim 1, wherein the swiveling wheel is provided on the mounting member.

8. The lifting device of claim 1, wherein the swiveling wheel is a belt wheel, and the flexible cable is a belt matching with the belt wheel.

9. The lifting device of claim 1, wherein the lifting assembly is provided in pairs on both sides of the support member.

10. The lifting device of claim 9, wherein the lifting assembly comprises:

a first lifting assembly, provided on a first side of the support member, and comprising a first swiveling wheel, a second lifting assembly, provided on a second side of the support member, and the second lifting assembly comprising a second swiveling wheel, wherein the first swiveling wheel and the second swiveling wheel are both connected to the same swiveling drive member.

11. The lifting device of claim 1, wherein the support member is a drawer body or a shelf.

12. A storage cabinet, comprising a box body and the lifting device of claim 1, wherein the mounting member is provided in the box body.

13. The storage cabinet of claim 12, wherein the storage cabinet is a refrigerator, a retail cabinet or a display cabinet.

* * * * *